Figure 1:
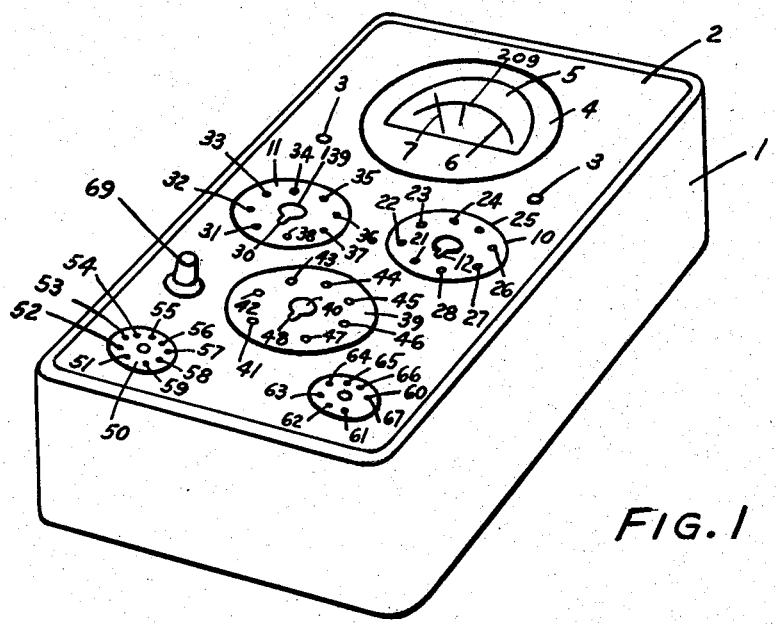

April 7, 1959         A. D. SMITH         2,881,385

TUBE TESTER

Filed April 27, 1953

INVENTOR.
ALLAN DEAN SMITH
BY
Charles L. Lovinbach

United States Patent Office 2,881,385
Patented Apr. 7, 1959

2,881,385

TUBE TESTER

Allan Dean Smith, Erie, Pa.

Application April 27, 1953, Serial No. 351,355

2 Claims. (Cl. 324—22)

This invention relates to testing equipment and more particularly to testing equipment for testing the filaments on radio, television, and other electronic tubes.

With the increase in use of radio, television, and other electronic equipment in homes and with the inconvenience and expense of keeping the equipment in repair, it has become desirable to have some simple means for testing various elements in the electronic equipment when the equipment does not operate properly. The vacuum tubes used in an electronic circuit are the parts which probably are most subject to trouble of any of the component parts in the circuit. One of the most common failures in electron tubes is the failure of the filament or heater of the tube. Accordingly, if some method could be devised for testing the continuity of filaments of the tubes in any electronic device using vacuum tubes, a considerable amount of difficulties of the device could be corrected by the owner of the device in his own home even though he were not an expert repairman.

It is, accordingly, an object of my invention to provide a simple means for testing the filaments of electronic tubes.

Another object of my invention is to provide a means for testing the filaments of vacuum tubes which is simple in construction, economical in manufacture, and simple in use.

Another object of my invention is to provide a testing device for testing the filaments of vacuum tubes wherein a large variety of tubes can be tested with a simple device.

Another object of my invention is to provide a testing device for the filaments in vacuum tubes whereby the user of the device can tell at a glance whether or not the filament is operative.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

Figure 2:
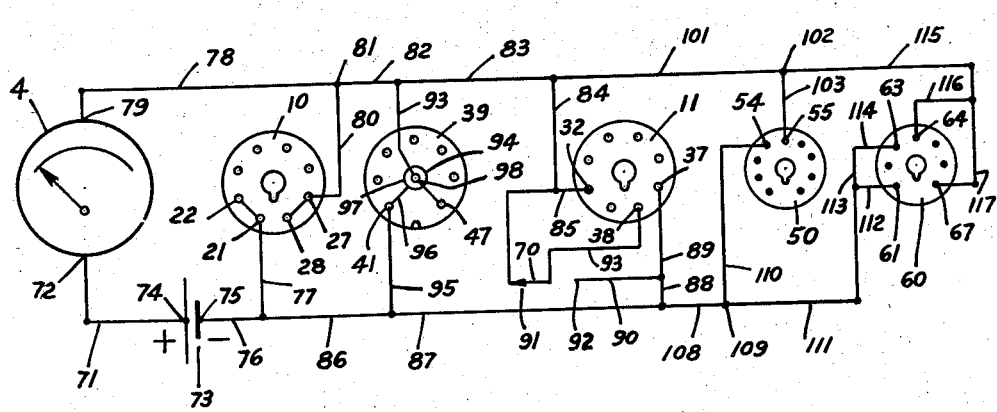

In the drawing:

Fig. 1 shows a perspective view of the testing device according to my invention; and Fig. 2 shows the wiring diagram of the testing device shown in Fig. 1.

It is customary for persons skilled in the use of electronic tubes to refer to the terminal on the base of the tube socket according to its numbered position when viewed from the bottom of the tube socket, starting clockwise, beginning at the keyway of the tube socket. For example, in the case of tube socket 10, terminal 21 would be counted No. 1, terminal 22 No. 2, etc. around the pins to terminal 28 which would be counted as No. 8.

Now with more specific reference to the drawing, in Fig. 1, I show a testing device having a case 1 and a top 2. The top can be held in place by means of screws 3 or similar fastening means. A galvanometer instrument 4 is disposed at one end of the top 2. The instrument may be a D.C. milliameter or similar instrument. The milliameter has a dial 5 and a scale 6 with an indicating needle 7 and the scale is preferably calibrated by guiding it into "bad" and "good" indicating sections by line 209.

Arranged on the top 2 adjacent the instrument 4, I locate five tube sockets which are of the five most usual types found in use in television and/or radio and electronic equipment circuits. The numeral 10 is a standard loctal socket which is adapted to receive tubes having eight pins thereon. Socket 10 has guideway or keyway 12 and pin receiving openings 21, 22, 23, 24, 25, 26, 27, and 28. Socket 11 is a standard octal socket and has round guide receiving member 139 and key guideway 30 with pin receiving openings 31, 32, 33, 34, 35, 36, 37, and 38 disposed around the periphery thereof. The socket 39 is a standard seven pin socket having an opening 40 in the center containing contact in the center of holes and contact means on the side which are adapted for testing miniature incandescent bulbs similar to pilot, flashlight, or indicator bulbs. The center terminal of the bulb will make contact with the center terminal 98 and the outside terminal will make contact with the outside terminal 94. Pin holes 41, 42, 43, 44, 45, 46, and 47 are spaced around the periphery of the socket 39 for receiving the pins on a standard seven pin tube.

A standard nine pin miniature socket 50 is located at one corner of the cover having the openings 51, 52, 53, 54, 55, 56, 57, 58, and 59 arranged around the outside of the socket for receiving the pins of a standard nine pin miniature tube. A standard seven pin miniature tube type socket 60 is located at another corner of the cover and it has the pins 61, 62, 63, 64, 65, 66, and 67. A knob 69 is attached to operate the switch 70 for the purpose to be later described.

Wire 71 is attached to the instrument 4 at 72 and to the battery 73 at 74. A terminal 75 of the battery 73 is connected through wire 76 to wire 77 which is in turn connected to openings 21 and 22 of tube socket 10. The wire 78 is connected to terminal 79 on the galvanometer instrument 4 and to wire 80 at 81. The other end of the wire 80 is connected to pins 27 and 28 of the tube socket 10.

It has been discovered that a large number of tubes of the standard eight pin loctal type sockets have heaters or filaments which are connected between either the number 2 and number 8 pin on the tube or the number 2 and the number 7 pin on the tube. The standard octal contains a filament connected between pin number 2 and pin number 7 or pin number 2 and pin number 8 or the number 7 and number 8 pin on the tube.

The battery terminal 75 is connected to the wire 76 through the wire 86, the wire 87, the wire 88, and the wire 89 to the terminal on the pin receiving opening 37 of the tube socket 11. Through the wire 90, the switch 70 can be switched so that the movable member 91 is in contact with the terminal 92, thereby connecting the wire 90 to the wire 93 to the terminal on the opening 38 on the tube base. The tube socket 39 is connected to the wire 82 through the wire 93 to the outside terminal 94 of the tube and to the terminal on pin opening 47. The wire 86 is connected through the wire 96 to the outside 97 of the center of the tube with wire 93 going to the central terminal 98. It will be apparent that with the arrangement shown for the tube socket 39, a tube having a filament connected between the terminals of the pin holes 41 and 47 of a standard seven pin tube base can be tested. Also, the conventional pilot light or a bulb can be inserted in the outside terminal 94 so that the center terminal of the pilot light base contacts the center terminal 98 to test the pilot light.

The tube socket 50 is designed to test a large number of nine pin miniature type tubes. It has been discovered that a large number of those in popular use at the present time have their filaments connected between the pins 54 and 55 of the tube which correspond to what is commonly referred to as pins 4 and 5 which are the numbers of the pins when counting pins starting in the wide spaced portion between the pins. The wire 83 is connected to the wire 101 at 102 to the wire 103 which is in turn connected to the terminal on pin 55 of the tube base socket 50. The wire 87 is connected through the wire 108 at the terminal 109 to the wire 110 and then to the pin 54 of the tube socket 50.

It has further been observed that a large number of the seven pin type miniature tubes have heaters connected between the number 1 and the number 7 terminal and between the number 3 and the number 4 terminal. The filaments of such tubes may be tested in the tube socket 60. Wire 108 is connected through the wire 111 to the wire 112 to the terminal pin 61 and through the wires 113 and 114 to the terminal pin 63. The wire 101 is connected through the wire 115 and the wire 116 to the terminal pin 64 of the tube socket and through the wire 117 to the pin 67.

It has been observed that with the circuit arrangement described herein, the majority of the tubes now in use in electronic circuits can be tested. It is merely necessary to observe the style of base of the tube to be tested. Then, by inserting the tube in the proper socket as disclosed herein, for example, if a standard loctal base tube is inserted in the socket number 10, the battery 73 will cause current to flow through the wire 71, through the galvanometer 4, through the terminal 79, wire 78, terminal 81 through the wire 80 to the pins 27 and 28 and through the heater to either the pins 21 or 22 through the wire 77, the wire 76, and back to the battery, thus completing a circuit to the heater of the tube and if the heater is not open circuited, the galvanometer 4 will indicate a reading indicating that the tube heater is functioning properly. The same procedure can be followed in testing most of the tubes now in general use in electronic circuits.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. A test instrument for testing the filaments of tubes comprising a case, a galvanometer and a plurality of tube sockets on said case, said tube sockets comprising a loctal socket, an octal socket, a seven pin socket, a nine pin miniature socket, and a seven pin miniature socket, a battery and a galvanometer connected in series, one group of terminals comprising the number one and number two pins of the loctal socket, the number one pin of the seven pin socket, the number seven pin of the octal socket, the number four pin of the nine pin miniature socket, and the number one and number three pins of the seven pin miniature socket, said one group of terminals being connected to one said battery terminal, a second group of terminals including the number seven and number eight terminals of said loctal socket, the number seven terminal of said seven pin socket, the number two terminal of said octal socket, the number five terminal of said nine pin miniature socket, and the number four and number seven terminals of said seven pin miniature socket, said second group of terminals being connected to said galvanometer, said first group of socket terminals being connected together and in series with said battery and galvanometer, said second group of terminals being connected together and to said galvanometer and battery, and a double throw switch having its common terminal connected to the number eight terminal on said octal socket and one switch terminal connected to the number two terminal and the other switch terminal connected to the number seven terminal on said octal socket.

2. A test instrument for testing the filaments of tubes comprising a case, a current indicating device and a plurality of tube sockets on said case, said tube sockets comprising a loctal socket, an octal socket, and a seven pin miniature socket, a source of potential and said current indicating device connected in series, one group of terminals comprising the number one and number two pins of the loctal socket, the number seven pin of the octal socket, the number four pin of the nine pin miniature socket, and the number one and number three pins of the seven pin miniature socket, said one group of terminals being connected to one terminal of said source of potential, a second group of terminals including the number seven and number eight terminals of said loctal socket, the number two terminal of said octal socket, the number five terminal of said nine pin miniature socket, and the number four and number seven terminals of said seven pin miniature socket, said second group of terminals being connected to said current indicating device, said first group of socket terminals being connected together and in series with said source of potential and said current indicating device, said second group of terminals being connected together and to said current indicating device and said source of potential, and a double throw switch having its common terminal connected to the number eight terminal on said octal socket and one switch terminal connected to the number two terminal on said octal socket and the other switch terminal connected to the number seven terminal on said octal socket.

References Cited in the file of this patent

UNITED STATES PATENTS

| | | |
|---|---|---|
| 1,854,900 | Goodwin | Apr. 19, 1932 |
| 2,000,594 | Hodgkinson | May 7, 1935 |
| 2,075,415 | Williams | Mar. 30, 1937 |
| 2,217,925 | Triplett | Oct. 15, 1940 |
| 2,244,495 | Manly | June 3, 1941 |